(12) United States Patent
Chang et al.

(10) Patent No.: US 11,450,228 B2
(45) Date of Patent: Sep. 20, 2022

(54) POINTER FOR FOCUSED READING

(71) Applicants: Michelle Minji Chang, Seoul (KR); Eric Saewon Chang, Seoul (KR)

(72) Inventors: Michelle Minji Chang, Seoul (KR); Eric Saewon Chang, Seoul (KR)

( * ) Notice: Subject to any disclaimer, the term of this patent is extended or adjusted under 35 U.S.C. 154(b) by 332 days.

(21) Appl. No.: 16/792,249

(22) Filed: Feb. 16, 2020

(65) Prior Publication Data

US 2020/0184844 A1 Jun. 11, 2020
US 2022/0044585 A2 Feb. 10, 2022

(51) Int. Cl.
*G09B 19/00* (2006.01)
*G09B 17/02* (2006.01)
*G09B 17/00* (2006.01)

(52) U.S. Cl.
CPC ............. *G09B 19/00* (2013.01); *G09B 17/02* (2013.01); *G09B 17/00* (2013.01)

(58) Field of Classification Search
CPC ......... G09B 17/00; G09B 17/02; G09B 17/04
USPC ................ 434/178, 179, 181, 182, 183, 184
See application file for complete search history.

(56) References Cited

U.S. PATENT DOCUMENTS

| | | | | |
|---|---|---|---|---|
| 118,180 A * | 8/1871 | Baade | | G09B 17/00 434/416 |
| 502,183 A * | 7/1893 | Gallegos | | G09B 17/00 434/167 |
| 598,666 A * | 2/1898 | Thomas | | B42D 9/005 281/42 |
| 651,894 A * | 6/1900 | Shermer | | B41J 11/60 451/445 |
| 1,607,544 A * | 11/1926 | McCready | | B41J 29/15 40/352 |
| 2,493,668 A * | 1/1950 | Nieto | | G09B 19/08 434/167 |
| 2,585,421 A * | 2/1952 | Armand | | B42D 9/008 24/565 |
| 2,699,748 A * | 1/1955 | Crawford | | B42D 9/008 281/42 |
| 2,840,925 A * | 7/1958 | Dunson | | G09B 17/04 434/181 |
| 2,986,822 A * | 6/1961 | Balchuns | | G09B 17/04 434/183 |
| 3,105,310 A * | 10/1963 | Schaill | | G09B 17/04 434/181 |
| 3,126,647 A * | 3/1964 | Hazelett | | B41B 1/02 434/157 |
| 3,255,538 A * | 6/1966 | Richman | | G09B 17/04 434/183 |
| 3,451,581 A * | 6/1969 | Warren | | G09B 17/04 220/4.22 |
| 3,712,712 A * | 1/1973 | Bosma | | G02B 27/021 359/813 |
| 3,841,002 A * | 10/1974 | Najarian | | G09B 17/04 434/183 |
| 3,982,332 A * | 9/1976 | Szymczak | | G09B 17/04 40/352 |
| 4,016,659 A * | 4/1977 | Merrigan | | G09B 17/04 40/352 |

(Continued)

*Primary Examiner* — Joseph B Baldori

(57) ABSTRACT

Various embodiments of a pointer for focused reading of a word or character are disclosed. For example, the pointer may include a frame, a reading pane defined inside the frame, a marker formed on the frame for pointing to a particular location of the reading pane, and an elongated handle attached to the frame at a non-zero angle.

20 Claims, 4 Drawing Sheets

(56) References Cited

U.S. PATENT DOCUMENTS

| | | | | |
|---|---|---|---|---|
| 4,078,319 A * | | 3/1978 | Mazeski | G09B 17/00 434/178 |
| 4,186,683 A * | | 2/1980 | LeRoy | B42D 9/007 116/235 |
| 4,450,536 A * | | 5/1984 | Schroeder | G03B 27/6271 355/126 |
| 4,688,510 A * | | 8/1987 | McNeely | B42D 9/005 116/237 |
| 4,898,115 A * | | 2/1990 | Bowlay-Williams | B42D 9/005 24/563 |
| D307,442 S * | | 4/1990 | Cooper | D10/61 |
| D355,216 S * | | 2/1995 | Grant | D19/59 |
| 5,414,946 A * | | 5/1995 | Leon | A47G 1/143 40/353 |
| 5,557,996 A * | | 9/1996 | Reber | B26B 29/06 30/292 |
| 5,653,035 A * | | 8/1997 | Chen | B26B 29/06 33/1 K |
| 6,471,517 B2 * | | 10/2002 | Richards | G09B 15/02 434/179 |
| D469,121 S * | | 1/2003 | Manzo | D19/37 |
| 6,832,915 B1 * | | 12/2004 | Kirby | G09B 17/02 40/352 |
| 7,056,122 B2 * | | 6/2006 | Lockett | G09B 1/00 40/352 |
| 7,066,737 B1 * | | 6/2006 | Mistry | G09B 17/02 434/178 |
| 7,565,759 B1 * | | 7/2009 | Brennan | G09B 17/04 116/235 |
| 7,954,444 B2 * | | 6/2011 | Smith | B42D 9/008 116/235 |
| 8,070,492 B1 * | | 12/2011 | McKinnis | G09B 17/02 434/179 |
| 8,480,400 B1 * | | 7/2013 | Armbruster | G09B 17/02 434/181 |
| D720,805 S * | | 1/2015 | Khayat | D19/34 |
| D741,731 S * | | 10/2015 | Lamanna | G01B 3/566 D10/64 |
| 10,621,884 B2 * | | 4/2020 | Stevens | G09B 11/04 |
| 2002/0093624 A1 * | | 7/2002 | Jordan | G09B 17/02 351/233 |
| 2003/0228559 A1 * | | 12/2003 | Hajjar | G09B 17/00 434/156 |
| 2004/0096809 A1 * | | 5/2004 | Eriksson | G09B 17/02 434/113 |
| 2012/0003616 A1 * | | 1/2012 | Frau | G09B 17/02 434/178 |
| 2018/0018897 A1 * | | 1/2018 | Harris | G09B 11/04 |

\* cited by examiner

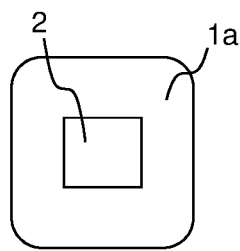 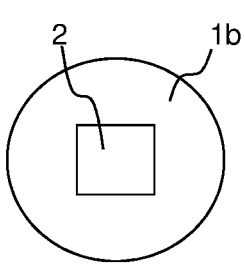 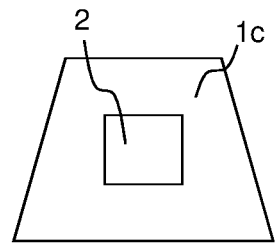 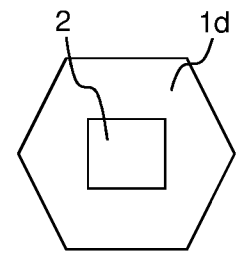
*Fig. 3A*  *Fig. 3B*  *Fig. 3C*  *Fig. 3D*
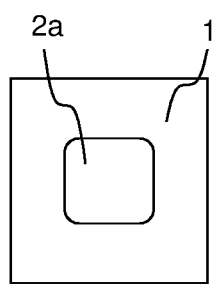 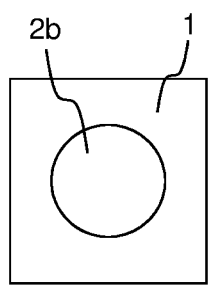 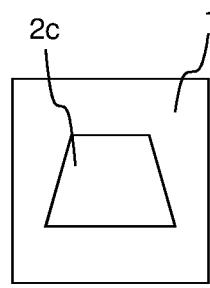 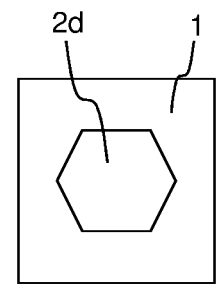
*Fig. 4A*  *Fig. 4B*  *Fig. 4C*  *Fig. 4D*
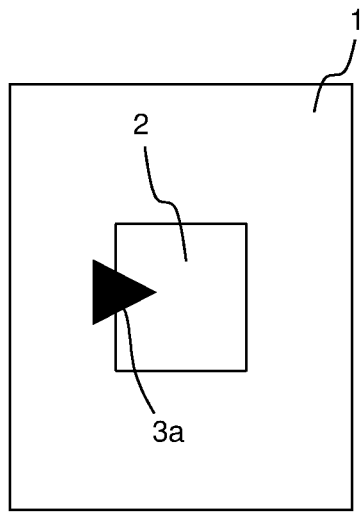
*Fig. 5*

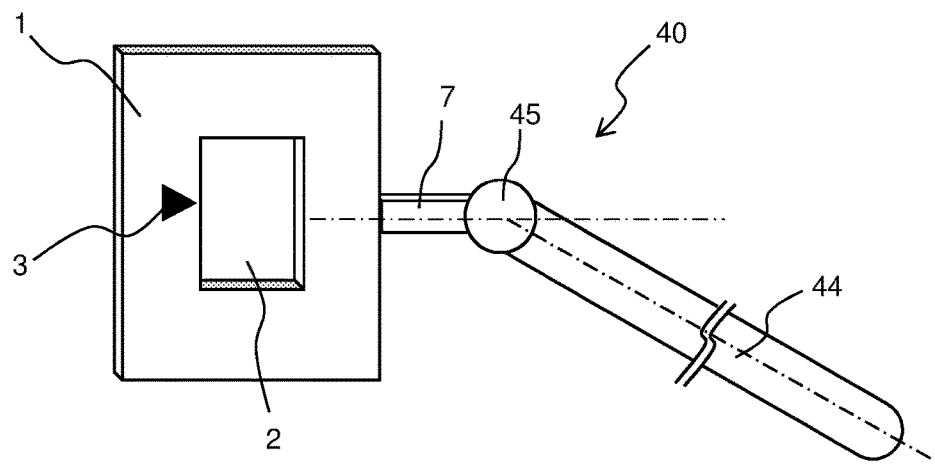
Fig. 8
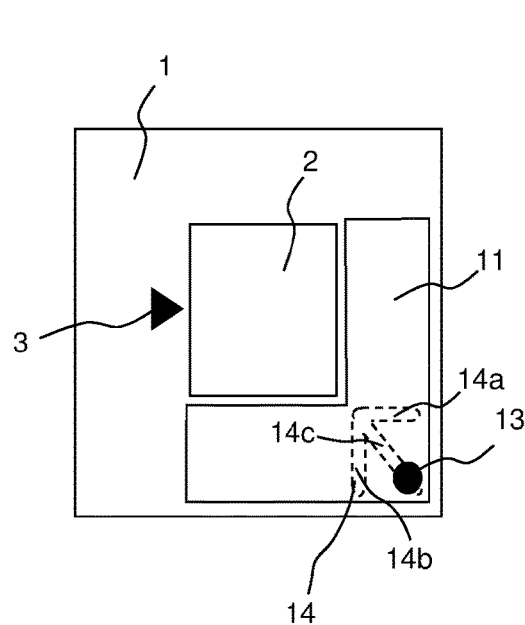
Fig. 9
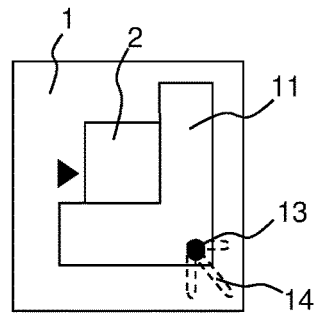
Fig. 10
Fig. 11
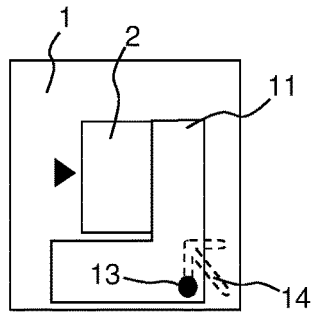
Fig. 12

POINTER FOR FOCUSED READING

FIELD OF THE DISCLOSURE

The present disclosure relates to a pointer for drawing attention of a student in a learning environment. In particular, various exemplary embodiments of the present disclosure relate to pointers having a frame that provides a focused viewing area for a student while restricting the view of the peripheral areas around the viewing area.

DESCRIPTION OF THE RELATED ART

Parents and teachers use a variety of pointers, such as pencils, pens, sticks, and rulers, to draw attention of students in classroom or other learning environments. For example, a parent or teacher uses a pointer stick having a finger-shaped pointer attached to one end thereof to point to a particular word or character while teaching children.

However, children with learning disabilities, such as, for example, attention deficit hyperactivity disorder (ADHD) or dyslexia, may still have difficulty in focusing on the particular word or character that is being pointed to by such pointers because they can be easily distracted by other words or characters located in close proximity to the pointers. This problem can be exacerbated when teaching a complex word or character, such as a Chinese or Korean word or character, which may often implicate not only the pronunciation of it but also its complicated meaning.

A parent or teacher may also use a pencil or pen or a ruler while reading a book with a student to draw a student's attention. However, using a pencil or pen may be disfavored because it can leave marks on the book. Using a ruler may be disfavored as well because it highlights the entire line of text and is unable to point to a particular word or character.

SUMMARY

Various exemplary embodiments of a pointer disclosed herein may overcome one or more of the problems and/or disadvantages discussed above and improve the art by way of a frame that provides a focused viewing area while substantially restricting the view of the peripheral areas around the viewing area.

To attain the advantages and in accordance with the purpose of the disclosure, as embodied and broadly described herein, one aspect of the disclosure may provide a pointer for focused reading of a word or character. The device may comprise a frame, a reading pane defined inside the frame, a marker formed on the frame for pointing to a particular location of the reading pane, and an elongated handle attached to the frame at a non-zero angle.

According to another exemplary aspect, the frame may be opaque. In an alternative embodiment, the frame may be transparent.

In some exemplary aspects, the reading pane may be formed by cutting out a middle portion of the frame. In one exemplary embodiment, the viewing area of the reading pane may occupy less than 30% of the surface area of the frame.

According to another exemplary aspect, a portion of the marker protrudes into the reading pane.

In one exemplary aspect, the frame may be rotatably attached to the handle. In another exemplary aspect, the frame may be removably attached to the handle to enable a replacement of the frame with another frame.

According to some exemplary aspects, the handle may comprise a first section extending along a first axis parallel to the plane of the frame, a second section extending along a second axis at a first angle with the first axis, and a third section extending along a third axis at a second angle with the second axis. The first axis and the third axis may be parallel to one another. Alternatively or additionally, the handle may comprise an angle joint for allowing the handle to swivel relative to the frame.

According to another exemplary aspect, the reading pane may be adjustable in width and/or height.

The pointer according to still another exemplary aspect may further comprise a cover plate configured to move relative to the reading pane to cover a portion of the reading pane. The pointer may further comprise a guiding groove formed in the frame, wherein the cover plate may comprise a boss extending into the guiding groove to guide the movement of the cover plate relative to the reading pane. The guiding groove may comprise a horizontal segment to guide a horizontal movement of the cover plate to adjust the width of the reading pane, a vertical segment to guide a vertical movement of the cover plate to adjust the height of the reading pane, and/or a diagonal segment to guide a diagonal movement of the cover plate to adjust both the height and width of the reading pane. In one exemplary embodiment, the frame may comprise at least two layers, and the cover plate may be interposed between the at least two layers.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIGS. 3A-3D are schematic illustrations of various possible shapes of a frame in a pointer, according to some exemplary embodiments of the disclosure.

FIGS. 4A-4D are schematic illustrations of various shapes of a reading pane inside a frame of a pointer, according to some exemplary embodiments.

FIG. 5 is a schematic illustration of a frame with a marker, according to another exemplary embodiment.

FIG. 8 is a perspective view of a pointer, according to an exemplary embodiment.

FIG. 9 is a schematic illustration of a frame with a cover plate configured to adjust the size of the reading pane, according to one exemplary embodiment.

FIGS. 10-12 are schematic illustrations for various positions of the cover plate relative to the reading pane.

DESCRIPTION OF THE EMBODIMENTS

Reference will now be made in detail to the exemplary embodiments of the present disclosure, which are illustrated in the accompanying drawings. Wherever possible, the same reference numbers will be used throughout the drawings to refer to the same or like parts.

Figure 1:
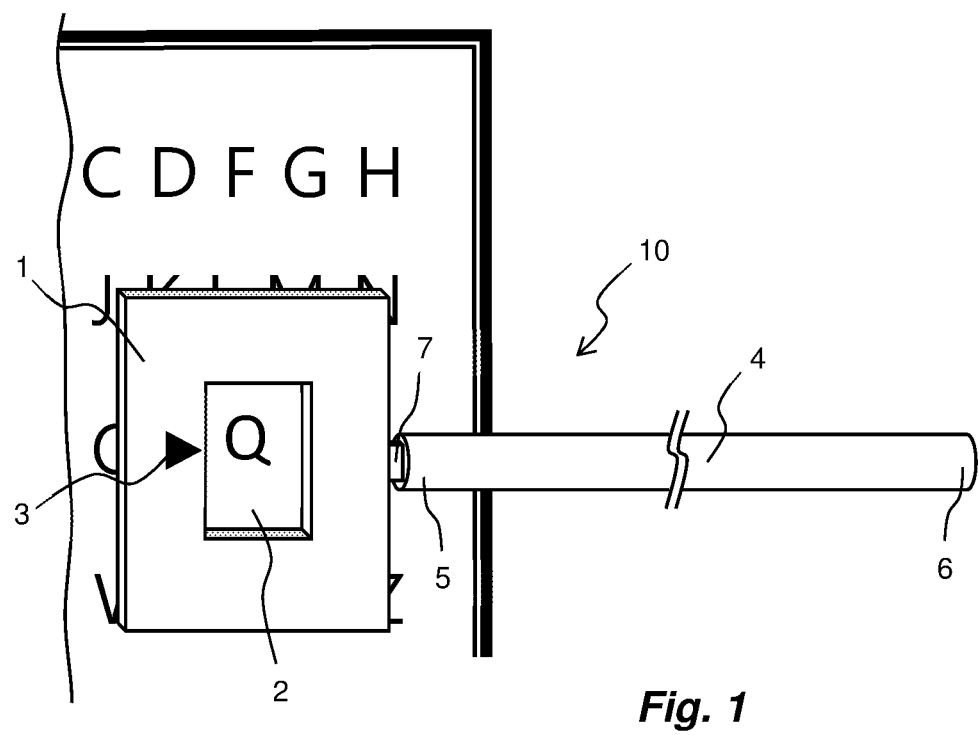
FIG. 1 is a perspective view of a pointer used to focus a particular character or word in a book, according to an embodiment of the disclosure.
Figure 2:
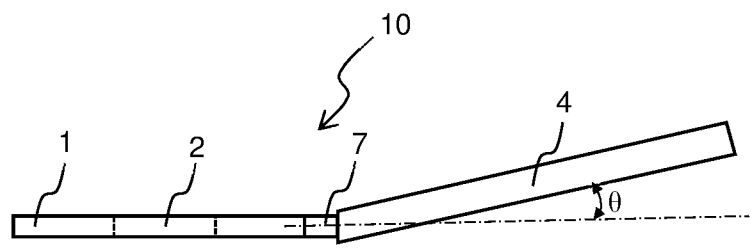
FIG. 2 is a side view of the pointer of FIG. 1.

FIG. 1 shows a perspective view of a pointer 10 for use in, for example, directing an individual's attention to a particular character or word (hereinafter referred to as a "target subject") in a book, according to one exemplary embodiment of the present disclosure. FIG. 2 is a side view of pointer 10 shown in FIG. 1. While pointer 10 of FIGS. 1 and 2 is depicted as being sized for a particular application in relation to a book, it should be understood that pointer 10 may be sized and/or configured for use in a number of different teaching environments, such as pointing a target subject in a blackboard or a large poster.

As shown in FIGS. 1 and 2, pointer 10 may include a frame 1, a reading pane 2 defining a viewing area inside frame 1, and a handle 4 attached to frame 1. Frame 1 may be flexible yet sufficiently rigid, such that it can bend when a force is applied thereto but return to its original shape when the force is removed. For example, frame 1 can be made of a thin plastic, a thick paper, or any other suitable material exhibiting similar material properties. In some exemplary embodiments, frame 1 can be made of multiple layers.

Frame 1 can be made of an opaque material, such that, when a target subject is positioned inside reading pane 2, frame 1 covers the material neighboring the target subject, thereby restricting the viewing area to only the viewing area defined by reading pane 2. This may effectively reduce potential distraction caused by the materials neighboring the target subject and improve the concentration of the individual. In an alternative embodiment, frame 1 may be transparent. In another alternative embodiment, frame 1 may be semi-translucent or shaded with color, which may hinder the viewing of the materials neighboring the target subject. In one exemplary embodiment, the transparency through frame 1 can be less than 50%.

While FIG. 1 depicts frame 1 having a rectangular shape, it should be understood that frame 1 can have a variety of different shapes. By way of example only and without limitation, frame 1 can be a square shape 1a with or without rounded corners (FIG. 3A), a circle or oval shape 1b (FIG. 3B), a trapezoidal shape 1c (FIG. 3C), or a hexagonal shape 1d (FIG. 3D).

Reading pane 2 may be an opening in frame 1 formed by cutting out a middle portion of frame 1, as best shown in FIG. 1. The viewing area of reading pane 2 may occupy less than 30% of the surface area of frame 1. In an exemplary embodiment, the viewing area of reading pane 2 may be between about 5% and about 20% of the surface area of frame 1. For example, frame 1 according to one exemplary embodiment has a square shape with a 5 cm side and a 23.0 cm$^2$ surface area, and reading pane 2 has a square opening with a 1.4 cm side and a 1.96 cm$^2$ viewing area.

Like frame 1, reading pane 2 may have a variety of different shapes. For example, reading pane 2 can be a square shape 2a with rounded corners (FIG. 4A), a circle or oval shape 2b (FIG. 4B), a trapezoidal shape 2c (FIG. 4C), or a hexagonal shape 2d (FIG. 4D).

Referring to FIG. 1, pointer 10 may also include a marker 3 formed on frame 1. Marker 3 may be a drawing on frame 1. Marker 3 may point to a particular character or word that is being displayed through reading pane 2. Although FIG. 1 shows a triangle marker 3 located on one side of frame 1, marker 3 can have a different shape, such as, an arrow shape or a finger shape, and can be located anywhere around reading pane 2 (e.g., top or bottom of frame 1). In one exemplary embodiment, a portion of marker 3a may protrude into reading pane 2, as shown in FIG. 5. In another exemplary embodiment, marker 3 may be removably attached to frame 1 so that marker 3 can be freely relocated from one location to another in frame 1.

Handle 4 can be an elongated stick or rod having a first end 5 and a second end 6 opposite to first end 5. First end 5 is attached to frame 1. To facilitate the connection between frame 1 and first end 5 of handle 4, frame 1 may include a connection tab 7 integrally formed with and extending from a side of frame 1, as shown in FIG. 1. In an alternative embodiment, handle 4 and frame 1 may be formed integrally as a unitary construction via, for example, molding a plastic material. In still another exemplary embodiment, frame 1 may be rotatably attached to handle 4 to allow the rotation of frame 1 relative to handle 4 and to thereby accommodate the various holding positions by a user.

In some exemplary embodiments, handle 4 may be configured for easy attachment and detachment to and from frame 1 to allow easy replacement of frame 1 with another frame having a different size, different shape, and/or different type. For example, pointer 10 may be provided as a kit having a plurality of frames having different sizes, shapes, and/or types. Depending on the application type, a user can then interchangeably use any of the plurality of frames provided with a handle provided in the kit.

As best shown in FIG. 2, handle 4 may be attached to frame 1 at an angle θ with respect to the plane of frame 1, such that frame 1 can be positioned substantially parallel to the reading plane (e.g., a plane of a book) when handle 4 is held by a user. By way of example only, angle θ may be greater than about 30° and less than about 60°.

Figure 6:
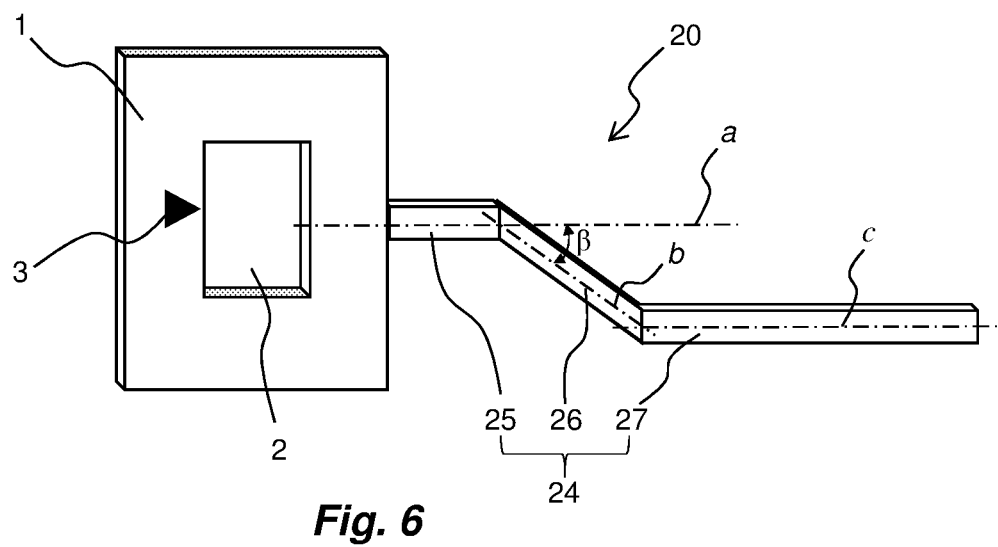
FIG. 6 is a perspective view of a pointer, according to another exemplary embodiment.

In an alternative embodiment, pointer 20 may comprise handle 24 formed of a plurality of sections extending in axes different from one another. For example, as shown in FIG. 6, handle 24 may comprise a first section 25 extending along axis a, which is parallel to frame 1, a second section 26 extending along axis b, which forms an angle β with axis a, and a third section 27 extending along axis c, which is parallel to axis a and forms (180-β)° with respect to axis b. By way of example only, angle β may be greater than about 30° and less than about 60°.

Figure 7:
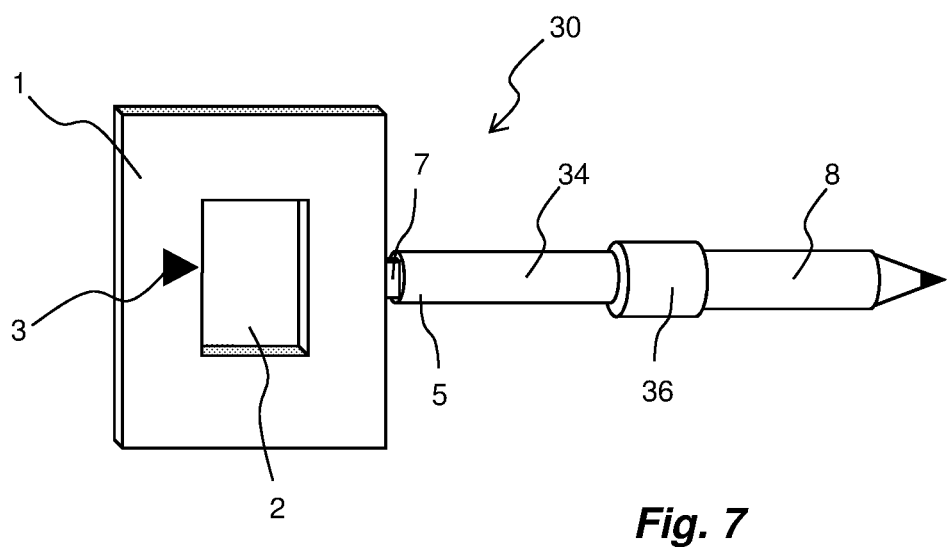
FIG. 7 is a perspective view of a pointer, according to one exemplary embodiment.

FIG. 7 shows pointer 30, according to another exemplary embodiment consistent with the present disclosure. Pointer 30 is substantially identical to that discussed above with reference to FIGS. 1 and 2, except that second end 36 of handle 34 is configured to receive a writing utensil 8, such as a pencil or pen, or another rod to extend the length of handle 34. In this particular embodiment, second end 36 may comprise a housing configured to receive a distal end of writing utensil 8. However, any other suitable engagement mechanism known in the art can be used instead.

FIG. 8 shows pointer 40, according to still another exemplary embodiment of the present disclosure. Pointer 40 may differ from pointer 10 shown in and described with FIGS. 1 and 2 in that first end 45 of handle 44 comprises an angle joint (e.g., swivel joint) for connection with tab 7 of frame 1. The angle joint allows handle 44 to swivel 360° relative to the axis of tab 7. This may provide a user with a greater flexibility in handling pointer 40.

According to some exemplary embodiments, pointer 10 may be provided with a suitable mechanism to adjust the size of the viewing area defined by reading pane 2 to accommodate the differences in the target subject intended to be positioned inside reading pane 2 (e.g., character type, character size, word length, etc.). For example, as shown in FIG. 9, pointer 10 may comprise a cover plate 11 configured to move relative to frame 1 and reading pane 2 to cover a portion of reading pane 2 and thereby adjust the size of reading pane 2. Cover plate 11 can be positioned over or under frame 1. In an alternative embodiment, frame 1 may be formed of at least two layers, and cover plate 11 may be disposed between the two layers.

In the disclosed embodiment shown in FIG. 9, cover plate 11 has an L-shape and comprises a button 13 having a boss extending into a guiding groove 14 formed in frame 1 to guide the movement of cover plate 11 relative to reading pane 2. Guide groove 14 may comprise a plurality of segments to allow cover plate 11 to move into specific positions with respect to reading pane 2. For example, guide groove 14 may comprise a horizontal segment 14a, a vertical segment 14b, and a diagonal segment 14c, all of which are interconnected so that button 13 can travel along any of horizontal, vertical, and diagonal segments 14a, 14b, and 14c.

When button 13 is positioned at the lower end of diagonal segment 14c of guiding groove 14 (see FIG. 9a), cover plate 11 remains outside of reading pane 2, and reading pane 2 can have the full opening. As button 13 is moved along diagonal segment 14c, cover plate 13 also moves diagonally covering the right side and the bottom side, causing the size reduction in both the width and the height of reading pane 2, as illustrated in FIG. 10. If only the height of reading pane 2 were to be reduced, button 13 can be moved in the right direction along horizontal segment 14a, as shown in FIG. 11. Similarly, if only the width of reading pane 2 were to be reduced, button 13 can be moved in the bottom direction along vertical segment 14b, as shown in FIG. 12. Accordingly, by manually moving button 13 along guide groove 14 of frame 1, the size of reading pane 2 can be readily and efficiently adjusted.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A pointer for focused reading of a word or character, comprising:
a frame comprising a guide groove, the guide groove comprising a horizontal segment, a vertical segment extending from a connected end of the horizontal segment, and a diagonal segment extending from the connected end and extending between the horizontal segment and the vertical segment, whereby the horizontal segment, the vertical segment, and the diagonal segment are interconnected to one another;
a reading pane defined inside the frame;
an L-shaped cover plate configured to move relative to the frame and the reading pane to cover a portion of the reading pane, the cover plate comprising a button having a boss extended into the guide groove of the frame to guide the movement of the cover plate relative to the frame and the reading pane by allowing the boss to travel along the horizontal segment, the vertical segment, and the diagonal segment;
a marker formed on the frame for pointing to a particular location of the reading pane;
an elongated handle attached to the frame at a non-zero angle,
wherein manually moving the button of the cover plate along the guide groove of the frame adjusts the size of the reading pane, and
wherein the guide groove of the frame and the cover plate are configured such that,
when the button is positioned at a lower end of the diagonal segment of the guide groove, the cover plate remains outside of the reading pane and the reading pane has a full opening,
when the button is moved up along the diagonal segment to a center position, the cover plate moves up diagonally to cause both a width and a height of the reading pane to decrease,
when the button is moved in a right direction along the horizontal segment of the guide groove from the center position to a right-most position, only the height of the reading pane is reduced from the full opening, and
when the button is moved in a downward direction along the vertical segment of the guide groove from the center position to a bottom-most position, only the width of the reading pane is reduced.

2. The pointer of claim 1, wherein the frame is opaque.

3. The pointer of claim 1, wherein the frame is transparent.

4. The pointer of claim 1, wherein the reading pane comprises a cut-out portion in a middle portion of the frame.

5. The pointer of claim 4, wherein the viewing area of the reading pane occupies less than 30% of the surface area of the frame.

6. The pointer of claim 1, wherein a portion of the marker protrudes into the reading pane.

7. The pointer of claim 1, wherein the frame is rotatably attached to the handle.

8. The pointer of claim 1, wherein the frame is removably attached to the handle to enable a replacement of the frame with another frame.

9. The pointer of claim 1, wherein the handle comprises:
a first section extending along a first axis parallel to the plane of the frame;
a second section extending along a second axis at a first angle with the first axis; and
a third section extending along a third axis at a second angle with the second axis.

10. The pointer of claim 9, wherein the first axis and the third axis are parallel to one another.

11. The pointer of claim 1, wherein the handle comprises an angle joint for allowing the handle to swivel relative to the frame.

12. The pointer of claim 1, wherein the frame comprises at least two layers, and the cover plate is interposed between the at least two layers.

13. The point of claim 1, wherein the reading pane has a hexagonal shape.

14. The point of claim 1, wherein the elongated handle comprises a first end connected to the frame and a second end comprising a housing configured to receive a distal end of writing utensil.

15. The point of claim 1, wherein the frame has a trapezoidal shape.

16. A pointer for focused reading of a word or character, comprising:
- a frame being transparent and comprising a guide groove, the guide groove comprising a horizontal segment, a vertical segment extending from a connected end of the horizontal segment, and a diagonal segment extending from the connected end and extending between the horizontal segment and the vertical segment, whereby the horizontal segment, the vertical segment, and the diagonal segment are interconnected to one another;
- a reading pane defined by a cut-out portion inside the frame, the cut-out portion defining less than 30% of the surface area of the frame;
- a cover plate configured to move relative to the frame and the reading pane to cover a portion of the reading pane, the cover plate comprising a button having a boss extended into the guide groove of the frame to guide the movement of the cover plate relative to the frame and the reading pane by allowing the button to travel along any of the horizontal segment, the vertical segment, and the diagonal segment;
- a marker formed on the frame for pointing to a particular location of the reading pane, a portion of the marker protruding into the reading pane; and
- an elongated handle attached to the frame at a non-zero angle, the handle comprising:
  - a first section extending along a first axis parallel to the plane of the frame;
  - a second section extending along a second axis at a first angle with the first axis; and
  - a third section extending along a third axis parallel to the first axis at a second angle with the second axis,
- wherein manually moving the button of the cover plate along the guide groove of the frame adjusts the size of the reading pane.

17. The pointer of claim 16, wherein the frame comprises at least two layers, and the cover plate is interposed between the at least two layers.

18. The pointer of claim 16, wherein the reading pane has a hexagonal shape.

19. The pointer of claim 16, wherein the elongated handle comprises a first end connected to the frame and a second end comprising a housing configured to receive a distal end of writing utensil.

20. A pointer for focused reading of a word or character, comprising:
- a frame being transparent and comprising at least two layers, the frame further comprising a guide groove, the guide groove comprising a horizontal segment, a vertical segment extending from a connected end of the horizontal segment, and a diagonal segment connected to the connected end and extending between the horizontal segment and the vertical segment, whereby the horizontal segment, the vertical segment, and the diagonal segment are interconnected to one another;
- a reading pane defined by a cut-out portion inside the frame, the cut-out portion defining less than 30% of the surface area of the frame;
- a cover plate interposed between the at least two layers of the frame and being configured to move relative to the frame to cover a portion of the reading pane, the cover plate comprising a button having a boss extended into the guide groove of the frame to guide the movement of the cover plate relative to the frame and the reading pane by allowing the button to travel along any of the horizontal segment, the vertical segment, and the diagonal segment;
- a marker formed on the frame for pointing to a particular location of the reading pane, a portion of the marker protruding into the reading pane; and
- an elongated handle attached to the frame at a non-zero angle, the handle comprising:
  - a first section extending along a first axis parallel to the plane of the frame;
  - a second section extending along a second axis at a first angle with the first axis; and
  - a third section extending along a third axis parallel to the first axis at a second angle with the second axis,
- wherein manually moving the button of the cover plate along the guide groove of the frame adjusts the size of the reading pane.

* * * * *